United States Patent
Hamman

[15] 3,703,747
[45] Nov. 28, 1972

[54] MOLDING CLIP
[72] Inventor: Denver C. Hamman, Evanston, Ill.
[73] Assignee: Illinois Tool Works Inc., Chicago, Ill.
[22] Filed: Dec. 9, 1970
[21] Appl. No.: 96,455

[52] U.S. Cl. .................. 24/73 HS, 52/717, 24/213
[51] Int. Cl. ............................................ A41b 19/00
[58] Field of Search ............... 24/73 PM, 73 HC, 73 SB, 73 SM, 24/73 HS, 73 AS, 73 MF, 73 NM, 73 B, 73 FT, 213 R, 213 B, 214, 67; 52/717, 718

[56] References Cited

UNITED STATES PATENTS

| | | | |
|---|---|---|---|
| 2,169,503 | 8/1939 | Schlegel | 49/489 |
| 2,755,576 | 7/1956 | Golden | 24/67 |
| 2,863,195 | 12/1958 | Elms | 24/73 |
| 2,977,652 | 4/1961 | Cochran | 24/73 |
| 3,188,730 | 6/1965 | Meyer | 24/222 |
| 3,315,325 | 4/1967 | Cornelius | 24/67 |
| 3,353,229 | 11/1967 | Kobrehel | 29/157.1 |

Primary Examiner—Bobby R. Gay
Assistant Examiner—Garry Moore
Attorney—Olson, Trexler, Wolters & Bushnell, Robert W. Beart, Michael Kovac, Jack R. Halvorsen and Thomas W. Buckman

[57] ABSTRACT

The present invention relates generally to spring clips for securing molding strips and the like upon a supporting workpiece, and more particularly to molding clips which may be adhesively secured to said work surface. Molding clips disclosed in the drawings of this application includes a plate section having an outer surface conforming substantially with the contour of the work surface to which the clip is to be attached. Laterally yieldable fingers are formed integral with and extend from said plate section, the free extremities of said fingers providing oppositely disposed shoulders for accommodating complementary oppositely disposed flanges of a molding strip. The area of integral connection of each finger with plate section is spaced laterally of the margin of the plate section adjacent the shoulder of the finger. Adhesive means associated with the mounting surfaces of the plate section is employed to secure the clip device to a supporting work surface.

7 Claims, 12 Drawing Figures

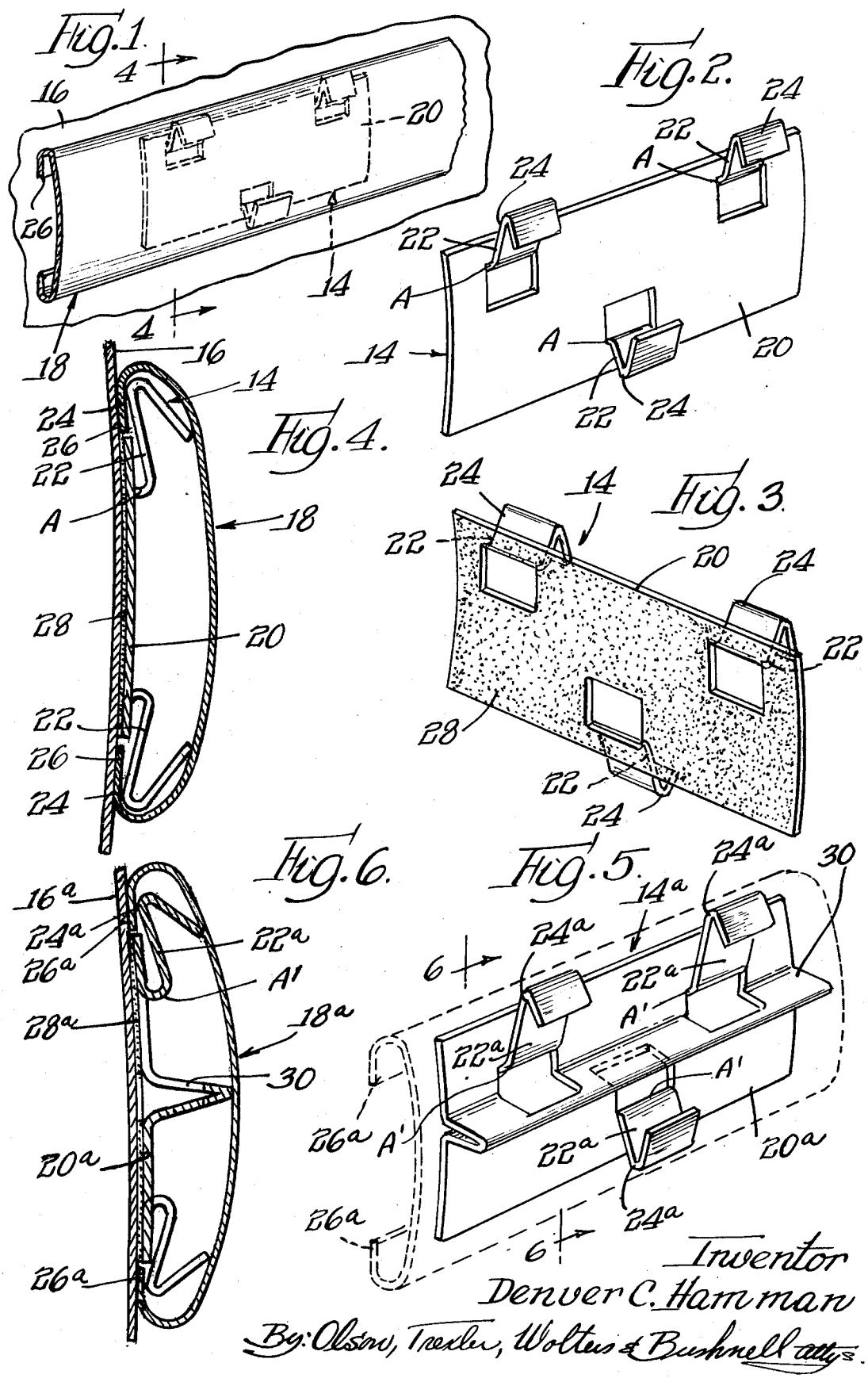

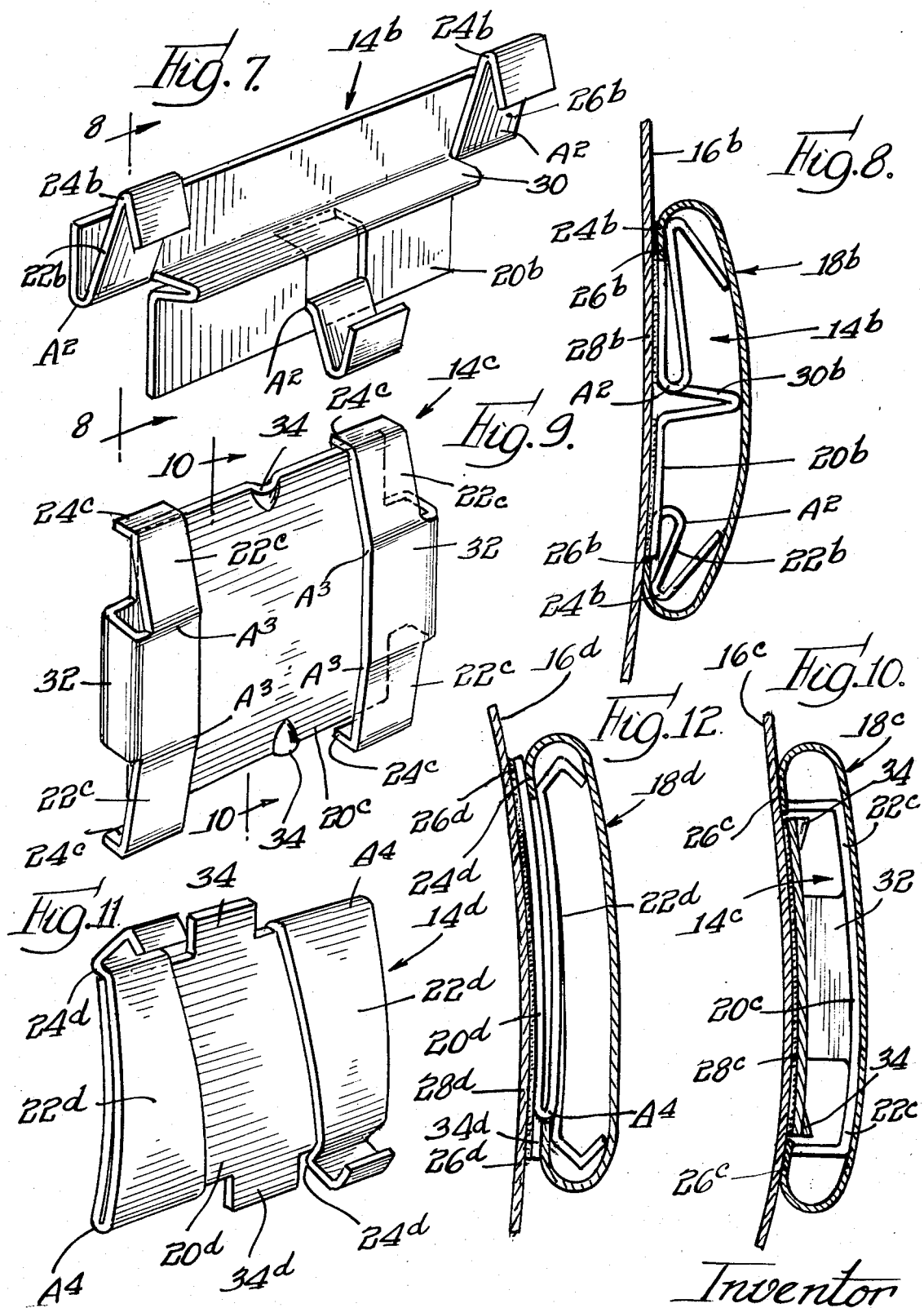

MOLDING CLIP

SUMMARY OF THE INVENTION

Molding clips have heretofore been employed which incorporate a stud member adapted to be telescopically associated with an aperture of the workpiece, as for example, an aperture in sheet metal body structure of an automobile. It is an important object of the present invention to provide an improved, structurally simple spring clip which may be firmly secured to a work surface without necessity of employing a stud member. To this end, the present invention contemplates adhesively securing the clip to the work surface.

Molding clips heretofore available are not structurally adapted for adhesive attachment to a work surface. Assume for example, that the studs of conventional molding clips were removed and adhesive material applied to the plate-like base of the clip. Because of the disposition of the shoulders on such clips for accommodating complementary flanges of a molding strip, the clip could not be effectively secured to a work surface by an adhesive. The present invention contemplates a unique structural clip arrangement which renders the clip particularly adaptable for adhesive attachment.

More specifically, the present invention contemplates a molding clip of the type referred to above wherein forces resulting from the load conditions to which such clips are normally subjected will be distributed through a novel finger and shoulder arrangement incorporated in the clip.

BRIEF DESCRIPTION OF THE DRAWINGS

The foregoing and other objects and advantages will be more apparent from the following detailed description when considered in connection with the accompanying drawings wherein:

FIG. 1 is a perspective view of a molding strip secured against a work surface by a molding clip of the present invention adhesively secured to the work surface;

FIG. 2 is an enlarged perspective view of the molding clip illustrated in FIG. 1;

FIG. 3 is a perspective view of the opposite side of the molding clip shown in FIG. 2;

FIG. 4 is an enlarged vertical, sectional view taken substantially along the line 4—4 of FIG. 1;

FIG. 5 is a perspective view of a modified form of molding clip contemplated by the present invention;

FIG. 6 is a vertical, sectional view taken substantially along the line 6—6 of FIG. 5;

FIG. 7 is a perspective view of another modified form of molding clip constructed in accordance with the teachings of the present invention;

FIG. 8 is a transverse, vertical, sectional view taken substantially along the line 8—8 of FIG. 7;

FIG. 9 is a perspective view of a further modified form of molding clip contemplated hereby;

FIG. 10 is a vertical, sectional view taken substantially along the line 10—10 of FIG. 9;

FIG. 11 is a perspective view of another modified form of molding clip embodying the present invention; and, FIG. 12 is a transverse, vertical, sectional view taken substantially along the line 12—12 of FIG. 11.

DESCRIPTION OF THE PREFERRED EMBODIMENTS

Referring now to the drawings more in detail wherein like numerals have been employed to designate similar parts throughout the various figures, it will be seen that FIGS. 1–4 inclusive, disclose a molding clip designated generally by the numeral 14. In FIGS. 1 and 4, the clip 14 is mounted upon the surface of a workpiece 16, and a conventional molding strip 18 is mounted upon the clip 14. The clip 14 includes a base or plate-like body 20 of substantially rectangular form. A plurality of fingers 22 are struck from the plate 20 within areas spaced laterally of the upper and lower margins of the plate 20. The finers 22 are laterally yieldable with respect to the plane of the plate 20 and the outer free extremities of the fingers 22 provide shoulders 24 against which flanges 26 of the molding strip 18 may be snapped into position. Adhesive material 28 covering the surface of the plate member 20 on the side oppositely disposed from the fingers 22 serves to support the clip upon the mounting surface of the workpiece 16.

Particular attention is directed to the fact that the area of integral connection of each finger with the plate 20 is spaced from the margin of the plate adjacent to the shoulder of the finger. As viewed in FIGS. 2 and 4, this area of integral connection is designated by the letter A. Should this area of connection be located at the immediate margin of the plate 20, forces tending to dislodge the plate would have a tendency to peel the plate away from the supporting surface. It will be noted that the fingers or arms 22 actually fulcrum or yield about the above-mentioned area of connection A. It will also be noted that the shoulders 24 at the free extremities of the fingers 22 extend laterally beyond the adjacent margin of the plate 20 thereby enabling the flanges 26 of the molding strip 18 to bear directly against the surface of the workpiece 16. With this arrangement, tendency for the plate 20 to be peeled away from the workpiece surface is reduced to a minimum and in most instances eliminated. The contour of the mounting surface of the plate 20 conforms with the contour of the work surface to which it is to be attached.

FIGS. 5 and 6 disclose a modified form of molding clip which is designated generally by the numeral 14a. The only significant structural difference between the molding clip 14a and the previously described clip 14, is in the provision of a central longitudinal rib 30 which is formed by folding the material of a plate 20a upon itself as clearly shown in the drawing. In view of the structural similarity of the clip 14a with the clip 14, parts of the clip 14a corresponding functionally and structurally with previously described parts of clip 14 are given corresponding numbers bearing the suffix (a). The area of connection of the fingers or arms 22a is designated by the letter A'. The longitudinal rib 30 lends additional strength to the plate 20a, and also enables the area of connection A' to be positioned at a greater distance from the margins of the plate section 20a. The plate section 20a, like the plate section 20, is attached to the surface of the workpiece 16a by adhesive material 28a. By having the areas of connection of the fingers 22a located at a considerable distance from the longitudinal margins of the plate section 28a, the tendency for the plate section to be pulled away from the workpiece is greatly reduced.

FIGS. 7 and 8 disclose another modified form of molding strip supporting clip which is designated generally by the numeral 14b. The clip 14b like the previously described clip 14a includes a longitudinal central reinforcing rib 30b. The only significant structural difference between the clip 14b and the clip 14a is that the opposite extremities of the plate 20b have been removed. In this manner the material required to produce the clip is substantially reduced. In instances where the reduced area of the mounting surface of the clip 20b will suffice for a particular application, the clip 14b will serve adequately to resist load forces tending to detach the clip from a work surface. All of the elements in FIGS. 7 and 8, having structural and functional similarity to corresponding elements previously described, are designated by like numerals bearing the suffix (b). Also the area of connection is designated by the letter $A^2$.

FIGS. 9 and 10 illustrate another embodiment of the invention in the form of a one piece clip device designated generally by the numeral 14c. The clip 14c includes a plate section 20c and a plurality of laterally yieldable fingers or arms 22c providing shoulders 24c for impinging upon the flanges 26c of a molding strip 18c. Each of the laterally flexible fingers 22c is integrally connected at $A^3$ with a bracket 32 of U-shaped cross section which is formed integral with transverse, as distinguished from longitudinal margins, of the plate section 20c. When the clip 14c occupies its normal molding strip supporting position, as illustrated in FIG. 10, there may be a tendency for the terminating edges of the molding strip flanges 26c to be forced into superimposed relation with the mounting plate section 20c. To preclude this possibility, protuberances 34 are struck outwardly from opposite longitudinal edges of the plate section 20c. These protuberances 34 will abut the terminating edges of the flanges 26c, should there be a tendency for the flanges to slide over the plate section 20c. The clip 14c, like the previously described clips, may be secured to the surface of the workpiece 16c by suitable adhesive material 28c. Forces tending to dislodge the clip 14c are first resisted by the resiliency of the fingers 22c flexing about the area $A^3$. The integral connection areas $A^3$ are not only spaced laterally with respect to the longitudinal margins of the plate section 20c, but also laterally with respect to the plane of said plate section. Thus the entire mounting surface area of the plate section 20c accommodates a coating of adhesive material 28c. The clip 14c, because of the structural and functional characteristics of the resiliently mounted fingers 22c, will not peel away from the work surface area. The disposition of the shoulders 24c is such as to permit one side of the molding strip flanges 26c to be engaged by the shoulders and the other side to bear directly against the work surface.

In FIGS. 11 and 12, another form of the invention is embodied in a clip designated generally by the numeral 14d. Clip 14d includes a mounting plate section 20d and a pair of arms or elongated fingers 22d, one of which is integrally connected at $A^4$ to one of the longitudinal margins of the plate section 20d. The other arm is similarly connected at $A^4$ to the opposite longitudinal margin of the plate section. The increase in length of the arms 22d over the corresponding fingers or arms previously described, materially enhances the resilient or yieldable characteristic of the arms. Oppositely disposed tabs 34d function similarly to the previously described protuberances or abutments 34 in preventing the flanges 26d of the molding strip 18d from superimposing plate section 20d. The shoulders 24d located at the extremity of each of the arms or fingers 22d, are adapted to engage the inner surfaces of the molding strip flanges 26d as clearly shown in FIG. 12. The opposite sides of the flanges 26d bear directly against the mounting surface of the workpiece 16d. Forces tending to pull the clip 14d away from the mounting surface of the workpiece are first resisted by the spring action of the arms 22d. In other words, forces initially do not act directly upon the longitudinal margins of the plate section 20d adjacent the shoulders 14d.

From the foregoing it will be apparent that the present invention contemplates the provision of an improved, structurally simplified form of clip for securing molding strips and the like against unauthorized dislodgement from a mounting surface. In all of the above described embodiments, forces tending to dislodge the clips from a mounting surface are first resisted by the resiliency of the fingers or arms formed integral with the base or plate section. These arms extend from an integral connection area spaced substantially from the margins of the mounting plate adjacent the flange retaining shoulders. Because of this unique arrangement of the integral mounting areas of the fingers or arms, the tendency for the adhesively attached plate section to peel away from the work surface is counteracted. Also, clips of the present design avoid the use of moulding clip shanks and hence preclude the necessity of perforating the supporting workpiece to condition it for accommodating a clip shank. It is very important to the automotive industry to eliminate edge areas of sheet metal stock normally subject to corrosion. This is particularly true in instances where the sheet metal body stock is perforated so as to expose raw edges of the metal stock. By following the teachings of the present invention, molding strips and the like may be adhesively attached so as to effectively resist load forces to which moulding clips are normally subjected.

It is a distinct advantage to have the fulcrum of each arm spaced a substantial distance from the shoulders of the arm. This is particularly significant in the modification shown in FIGS. 11 and 12, wherein the arms extend across the complete width of the mounting plate. In such instances a positive pressure is exerted along the edges of the clip adjacent the point of fulcrum. In other words, forces tending to pull the free extremity of the arm away from the plane of the clip body will not tend to peel the clip from the workpiece, but rather to force the clip against the workpiece at the point where the arm is hingedly connected with the margin of the clip plate.

I claim:

1. A one piece spring clip device for securing an element, such as a molding strip upon a supporting work surface, including a plate section having a mounting surface conforming substantially with the contour of a work surface to which the clip device is to be secured, fingers formed integral with and yieldable laterally with respect to said plate section, the free extremities of said fingers presenting shoulders adjacent opposite margins of the plate section for yieldably accommodating complementary oppositely disposed flanges of a molding strip, the shoulder of each finger extending beyond the margin of the plate section adjacent thereto, the area of integral connection of each finger with said plate section being spaced laterally of the margin of the plate section adjacent the shoulder of said finger to substantially reduce the load on the associated margins of the plate section, and adhesive means associated with the mounting surface of said plate section for securing the clip device to a supporting work surface.

2. A one piece spring clip device for securing an element, such as a molding strip upon a supporting work surface as set forth in claim 1, wherein the area of integral connection of each finger with said plate section is located intermediate the opposed margins of said plate section.

3. A one piece spring clip device for securing an element, such as a molding strip upon a supporting work surface as set forth in claim 1, wherein the area of integral connection of each finger with said plate section is located adjacent the margin of the plate section oppositely disposed from the margin of the plate section adjacent the shoulder of the finger.

4. A one piece spring clip device for securing an element, such as a molding strip upon a supporting work surface as set forth in claim 1, wherein the area of integral connection of each finger with the plate section is along a margin extending substantially normal to the margins of the plate section adjacent the shoulders.

5. A one piece spring clip device for securing an element, such as a molding strip upon a supporting work surface as set forth in claim 1, wherein each finger comprises a portion of stock struck from the plate section.

6. A one piece spring clip device for securing an element, such as a molding strip upon a supporting work surface as set forth in claim 1, wherein the plate section is provided with a central longitudinal rib.

7. A one piece spring clip device for securing an element, such as a molding strip upon a supporting work surface as set forth in claim 6, wherein each finger comprises a portion struck from said longitudinal rib.

* * * * *